United States Patent
Argumedo et al.

(10) Patent No.: US 12,405,117 B1
(45) Date of Patent: Sep. 2, 2025

(54) PATHFINDING USING QUANTUM COMPUTATIONAL ANALYTICS

(71) Applicant: United Services Automobile Association (USAA), San Antonio, TX (US)

(72) Inventors: Marta Leigh Argumedo, Helotes, TX (US); Andre Rene Buentello, San Antonio, TX (US); Noe Alberto Martinez, San Antonio, TX (US); Jose L. Romero, Jr., San Antonio, TX (US); Desmond Montrell Savage, San Antonio, TX (US); Paula Ann Whittington, Helotes, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 103 days.

(21) Appl. No.: 17/855,029

(22) Filed: Jun. 30, 2022

(51) Int. Cl.
| | | |
|---|---|---|
| G01C 21/34 | (2006.01) | |
| G01C 21/36 | (2006.01) | |
| G06N 10/20 | (2022.01) | |
| G06N 10/40 | (2022.01) | |

(52) U.S. Cl.
CPC ..... *G01C 21/3423* (2013.01); *G01C 21/3484* (2013.01); *G01C 21/3664* (2013.01); *G06N 10/20* (2022.01); *G06N 10/40* (2022.01)

(58) Field of Classification Search
CPC ............ G01C 21/3423; G01C 21/3484; G06N 10/20; G06N 10/40
See application file for complete search history.

(56) References Cited

U.S. PATENT DOCUMENTS

| | | | |
|---|---|---|---|
| 2007/0156333 A1* | 7/2007 | McBride | G09B 29/106 701/423 |
| 2014/0006631 A1* | 1/2014 | Meskauskas | G01C 21/3614 709/227 |
| 2014/0358435 A1* | 12/2014 | Bell | G01C 21/3492 701/527 |
| 2017/0357539 A1* | 12/2017 | Dadashikelayeh | G06F 9/5044 |
| 2017/0370740 A1* | 12/2017 | Nagy | G01C 21/3484 |
| 2018/0051997 A1* | 2/2018 | Grochocki, Jr. | G01C 21/3415 |
| 2019/0213889 A1* | 7/2019 | Calleja Alvarez | H04H 20/57 |
| 2020/0349509 A1* | 11/2020 | Sharma | G06Q 10/047 |
| 2021/0248489 A1* | 8/2021 | Yarkoni | G06Q 10/047 |
| 2021/0390159 A1* | 12/2021 | De Carvalho, Jr. | G06N 5/01 |
| 2022/0012301 A1* | 1/2022 | Okada | G06N 10/60 |
| 2023/0177415 A1* | 6/2023 | Kumar | G06N 10/60 |
| 2023/0385671 A1* | 11/2023 | Griffin | G06N 10/80 |

* cited by examiner

*Primary Examiner* — Keith D Bloomquist
(74) *Attorney, Agent, or Firm* — Fletcher Yoder, P.C.

(57) ABSTRACT

This disclosure is directed to systems and techniques for identifying one more path solutions in a traffic or pedestrian context that address multiple factors specified by an individual or by groups of individuals. As discussed herein, such pathfinding techniques may take into account multiple constraints or preferences specified by individuals as well as multiple sources of data, including sensor or image data, online data sources, data derived from online or smart home devices, calendar or schedule data tied to the individual and so forth. As discussed herein, the present disclosure is related to performing combinatorial analysis using quantum computing systems to efficiently identify and/or characterize potential paths based on criteria specified by users as well as a variety of accessible and disparate data sources.

15 Claims, 6 Drawing Sheets

PATHFINDING USING QUANTUM COMPUTATIONAL ANALYTICS

BACKGROUND

The present disclosure is related to generating and/or selecting a suitable path between two or more locations. Such paths may be in the context of vehicular or pedestrian travel. More specifically, the present disclosure is related to performing combinatorial analysis using quantum computing systems to efficiently identify one or more paths meeting criteria specified by an individual and using a broad array of data sources for evaluating the possible paths and criteria.

The variables involved in identifying possible paths between two or more locations, either in a vehicular or pedestrian context, can be numerous. By way of example, in a city street context, the number of potential paths between any two locations may be a function of every accessible interconnected street within the city absent other criteria by which possible paths may be limited or eliminated. Likewise, such evaluation of paths may be further complicated by other information separate from the geographic considerations. For example, traffic density, construction, accidents, time of day, and various user preferences related to congestion, type of road, and so forth result in a combinatorial analysis of variables that make identification of a multi-factor optimized path infeasible. In other contexts, such as pedestrian pathfinding contexts, a similar array and number of potential variables may lead to similarly intractable pathfinding problems based on the number of variables specified by an individual.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Systems and techniques are discussed herein for identifying one more path solutions in a traffic or pedestrian context and that address multiple factors specified by an individual. As discussed herein, such pathfinding techniques may take into account multiple constraints or preferences specified by individual as well as multiple sources of data, including sensor or image data, online data sources, data derived from online or smart home devices, calendar or schedule data tied to the individual and so forth. As discussed herein, the present disclosure is related to performing combinatorial analysis using quantum computing systems to efficiently identify and/or characterize potential paths based on criteria specified by a user as well as a variety of accessible and disparate data sources.

In an embodiment, a method is provided. In accordance with this embodiment a request to generate a path for an individual is received. One or more preferences to be applied in generating the path are retrieved. One or more data stores or sensor data are accessed that pertain to the requestor, other individuals relevant to path generation, or a site or region relevant to path generation. One or more path models are generated using quantum computational techniques and based on the one or more preferences and the one or more data stores or sensor data. The one or more path models are provided to the individual to select a path In another embodiment, a quantum computing path generation system. In accordance with this embodiment, the quantum computing path generation system comprises: a communication component configured to facilitate communication between the quantum computing path generation system and devices or data stores accessible over a network; a qubit processor; a processor configured to execute processor-executable code to instruct the qubit processor to perform path generation operations; a qubit memory comprising one or more qubits and utilized by the quantum processor; and a storage configure to store processor-executable code execute by the processor. The processor-executable code, when executed, cause the quantum computing path generation system to perform acts comprising: receiving a request to generate a path for an individual; retrieving one or more preferences to be applied in generating the path; accessing one or more data stores or sensor data pertaining to the requestor, other individuals relevant to path generation, or a site or region relevant to path generation; generating one or more path models using quantum computational techniques and based on the one or more preferences and the one or more data stores or sensor data; and providing the one or more quantum computed path models to the individual to select a path In yet another embodiment a method is provided. In accordance with this embodiment an interface of a path finding application is displayed. The interface comprises one or more fields for receiving inputs, the one or more fields comprising: an avoid field; a prefer field; a minimize field; a maximize field; a constraints field; and a tolerance field. Inputs are received for one or more fields via the interface. One or more path models are generated using quantum computing techniques and based on the inputs and using quantum computing techniques. The one or more path models are displayed for review.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
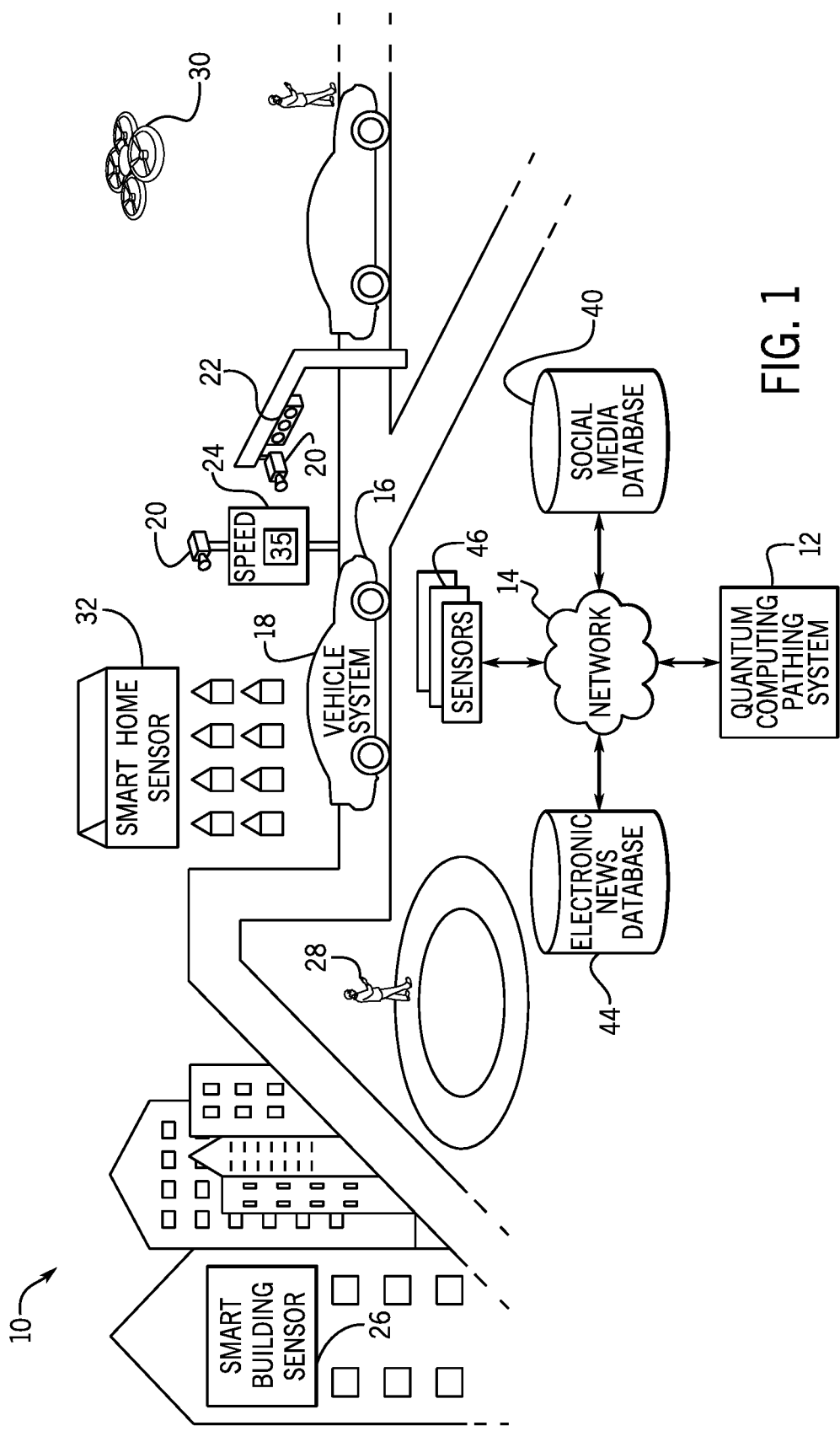
FIG. 1 is a diagram of a system including a variety of data sources that may be provided to a quantum computing path finding system to perform combinatorial analysis in accordance with aspects of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

As discussed herein, certain efforts in identifying a path to be traversed between two or more points, either in a vehicle or as a pedestrian, may be computationally challenging due to the number of possible path segments, their interconnections, and a variety of constraints or preferences imposed by an individual for whom the path is being generated. In practice, as the number of variables or parameters related to path development is increased, the complexity of the path problem is disproportionately increased. As a result, in conventional approaches the variables managed by a path finding technique may be greatly limited, such as to travel time or distance traveled. In practice, however, an individual may have numerous preferences (or constraints) across a range of variables related to the requested path. Such multifactor approaches however are computationally difficult to resolve using conventional approaches to the combinatorial and probabilistic aspects such optimization involves.

With the preceding in mind, the present techniques may utilize multiple individual preference in combination with data acquired from online devices and online data sources to facilitate the generation of one or more paths meeting the preferences of a user. To efficiently process and generate or update the suitable path model, a quantum computing path finding or path generation (i.e., pathing) system may be employed to perform the combinatorial analysis. Indeed, the number of data sources that provide relevant data to the path finding process may vary in real time or by geographic location. Further, the volume of data provided to the quantum computing pathing system to analyze in combination with the user defined preferences and/or constraints may overwhelm other computing systems. However, since the quantum computing pathing system operates using quantum mechanics and qubits, the data acquired from various data sources may be evaluated simultaneously with the user preferences or constraints in an efficient matter. That is, the quantum computing pathing system may evaluate the various sources of data in a variety of states (e.g., conditions present or not present) in superposition (e.g., conditions present and not present at the same time) to update the expected path model for the individual in real time so as to adhere to the user's preferences and/or constraints.

Indeed, as advances continue in the quantum computing field, quantum computers with processors equipped with over 100 qubits are capable of performing different types of combinatorial analysis for various types of problems. That is, these quantum computers can represent each individual input variable in a multidimensional space as a one bit, a zero bit, and as both: a one bit and a zero bit at the same time or simultaneously. As a result, these quantum computers may employ quantum wave interference to simultaneously analyze a number of input variables relevant to a combinatorial optimization problem to find an optimal (e.g., highest probability of success, lowest cost function, and so forth) solution to the problem. In this way, performing combinatorial analysis that may involve a significant amount of computing resources by a classical supercomputer may be performed using less resources in a more efficient manner via a quantum computer.

With the foregoing in mind, a quantum model may be generated to represent a plurality of solutions to a combinatorial optimization problem by simultaneously evaluating a plurality of input variable states. The quantum model may thus enable users to have vast improvements in cryptography, data analytics, forecasting, pattern matching, and so forth. Indeed, after a particular input variable state of the quantum model is observed or measured by an individual considering the problem, the quantum model may immediately yield a solution for the optimization problem because the quantum model has already computed all of the solutions, thereby enabling additional processes or services to be initiated in an efficient amount of time.

For instance, after receiving a set of preferences and/or constraints and a request for a path meeting these preferences and constraints, a quantum model for the path problem may be generated using multiple sources of available data to represent a plurality of solutions in the form of acceptable paths for the requestor. The plurality of paths may be filtered to identify a subset of path solutions that have the highest optimization with respect to the user's preferences and constraints. As more data (e.g., real-time data and updates) is collected into the quantum model, the subset of path solutions may converge to a small set of solutions that may be presented to an individual who requested the path.

By way of introduction, FIG. 1 illustrates a diagram of a system 10 at a municipal scale that includes a variety of data sources to assist a quantum computing pathing system 12, according to an embodiment of the present disclosure. Referring to FIG. 1, the system 10 may include a network 14 that may receive relevant data from the variety of data sources and transmit the data received from the data sources to the quantum computing pathing system 12. As will be discussed in greater detail below, the quantum computing pathing system 12 may simultaneously process the relevant data using quantum computing operations to efficiently account for path-related events or stat changes and update a suggested path. Moreover, the quantum computing pathing system 12 may coordinate or automate certain actions or commands in view of the updated path suggestions and the various devices or individuals that may be projected to be along the suggested path. That is, in some embodiments, the quantum computing pathing system 12 may generate a coordinated set of instructions to various devices to modify operations in conjunction with each other to assist individuals in view of the path recommendation.

The network 14 may receive data regarding operations, location, and other properties related to vehicles 16 via vehicle systems 18. For example, the vehicle system 18 may include speed data or location data, which the quantum computing pathing system 12 may use to collect various types of data (e.g., traffic density, average or median speed, and so forth) in the area at a given moment. In certain embodiments, the vehicle 16 may include a video system (e.g., image and audio sensors that collect image and audio data), which may capture real-time area data (e.g., vehicle traffic in the area, pedestrian traffic in the area, weather conditions) at a street level and send the captured data to the quantum computing pathing system 12. In some embodiments, the video system may include an image sensor or any suitable a camera to capture real-time image data.

The system 10 may also include cameras 20 that may be affixed to a traffic light 22 or a speed detector 24. The traffic light 22 (or traffic sign, or dedicated data collection device like a traffic collection tower) and the speed detector 24 may send collected data to the quantum computing pathing system 12 via the network 14 or any other suitable communication protocol. For example, the traffic light 22 may send data regarding the number of vehicles 16 passing the traffic light 22. The speed detector 24 may send data to the quantum computing pathing system 12 regarding the posted speed limit in the area and the measured or observed speed of vehicles within measurement range of the speed detector 24.

The quantum computing pathing system 12 may collect, via the network 14, data from building sensors 26. The building sensors 26 may be coupled to structures (e.g., buildings, bridges, roads, and so on). The building sensors 26 may include sensors that may provide relevant information related to the ambient environment within or outside a building and which may be useful in a vehicle or pedestrian path-finding exercise, as discussed in greater detail herein.

The quantum computing pathing system 12 may also collect data from and/or about individuals in the area. For example, the individuals may be wearing wearable devices 28 that may include location and/or movement tracking devices. The quantum computing pathing system 12 may track the location and movement of the individuals via the wearable devices 28, which may provide information related to the presence of individuals in various locations.

Additionally, the quantum computing pathing system 12 may receive data from smart home sensors 32. The smart home sensors 32 may include devices that may be positioned in a home or building and may be connected to a network. The smart home sensors 32 may include sensors that may provide relevant information related to the ambient environment within or outside a building and which may be useful in a vehicle or pedestrian path-finding exercise, as discussed in greater detail herein.

In addition to the devices described above, in some embodiments, drones 30 (e.g., unmanned aerial vehicles) may be employed to collect traffic data, image data, and the like. The drones 30 may be ground-based drones that traverse roads and different terrains via the air or surface to collect various types of data. The drones may be positioned in the area and provide data to the quantum computing pathing system 12 or other suitable device to perform the embodiments described herein.

As mentioned above, the quantum computing pathing system 12 may be communicatively coupled to the sensors and devices described above via the network 14 or some suitable communication protocol. In addition, relevant data may also be gathered from social media databases 42. Using web crawlers or other web monitoring tools, the quantum computing pathing system 12 may track or receive information related to area data (e.g., regarding traffic) or event data (e.g., text-based social media posts, pictures, videos, and so forth). The social media database 42 may include data available via social media sites such as Facebook®, Twitter®, Waze® and the like. In one embodiment, the social media database 42 may include information associated with the individuals, businesses, organizations, governmental agencies, news outlets, and the like. For example, the data of the social media database 42 may be associated with the location of a user or a destination of the user. The social media database 42 may also include data trending on social media sites that may not be directly associated with any particular measurement described above. However, the trending data may provide the quantum computing pathing system 12 additional data that may be related to the data collected from the sources described above. For instance, the data from the social media database 42 may include information regarding a disruptive situation and may be correlated or verified with data acquired from the sensors or devices mentioned above or other suitable devices and sensors.

Additionally, the system 10 may include an electronic news database 44, which may include information provided by various news services that may be updated in real-time or near real-time via a network (e.g., Internet). The electronic news database 44 may provide information regarding weather or traffic alerts, natural phenomenon alerts, non-natural phenomenon alerts (e.g., traffic, active shooter), and any other information that may be published via an electronic news outlet such as a webpage, news database, or the like. As such, the quantum computing pathing system 12 may become aware of the likelihood of a disruptive event affecting a certain area.

In addition to the data sources mentioned above, the quantum computing pathing system 12 may collect data from a wide variety of sensors 46. The sensors 46 may include any type of device capable of capturing, image, video, and/or audio data, of detecting people, vehicles, or movement, and so forth. One or more sensors 46 may be disposed on different types of property such as an individual, a home, a vehicle, and the like. In certain embodiments, one or more sensors 46 may be disposed within certain rooms of a building, outside of a building, within a vehicle, or outside a vehicle. The sensors 46 may also be disposed on devices carried by or worn by individuals. For example, the sensors 46 may be disposed on mobile phones, wearable electronics, and the like. In one embodiment, the sensors 46 may provide location information regarding the sensors 46. As such, the sensors 46 may provide global positioning system (GPS) coordinates, motion over time, and the like to indicate a location or movement of the sensors 46.

Figure 2:
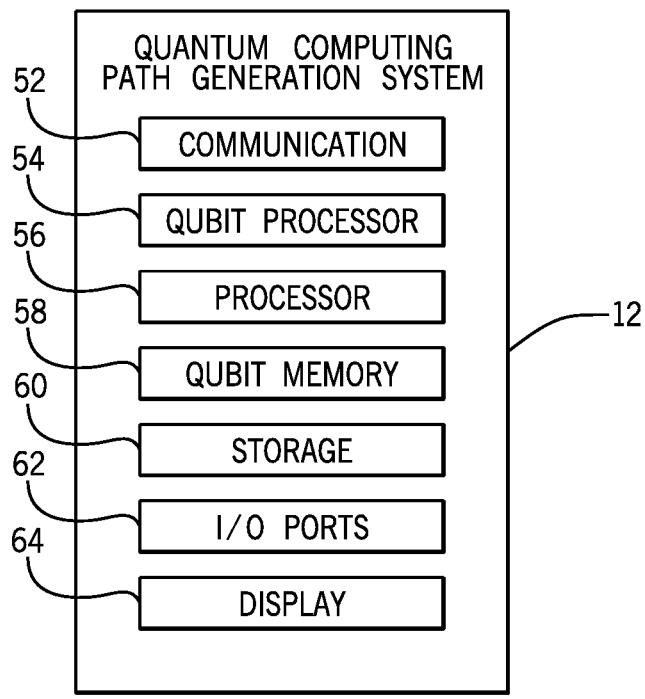
FIG. 2 is a block diagram of example components within the quantum computing path finding system, in accordance with aspects of the present disclosure.

The quantum computing pathing system 12 may then use the collected data for additional analysis in accordance with the embodiments presented herein. Before describing the analysis operations, FIG. 2 is a block diagram of example components that may be part of the quantum computing pathing system 12, according to an embodiment of the present disclosure. Although the following description details some example components that make up the quantum computing pathing system 12, it should be understood that the quantum computing pathing system 12 may include additional or fewer components.

Referring now to FIG. 2, the quantum computing pathing system 12 may include a communication component 52, a qubit processor 54, a host processor 56, a qubit memory 58, a storage 60, input/output (I/O) ports 62, a display 64, and the like. The communication component 52 may be a wireless or wired communication component that may facilitate communication between the quantum computing pathing system 12, various types of devices, the network 14, and the like. Additionally, the communication component 52 may facilitate data transfer to the quantum computing pathing system 12, such that the quantum computing pathing system 12 may receive data from the other components depicted in FIG. 1 and the like.

The qubit processor 54 may be any type of quantum processing unit (QPU) that provides a computational unit that relies on quantum principles to perform a task. In some embodiments, the qubit processor may include a qubit random access memory that includes registers and gates, a quantum control unit that drives qubits to desired states, and a classical control interface that can facilitate interactions between the host processor 56 capable of executing computer-executable code to instruct the qubit processor 54 to perform certain analysis operations (e.g., combinatorial analysis). The processor 56 may also include multiple processors that may perform the operations described below.

The qubit memory 58 may include one or more qubits that make up basic units of quantum memory. Each qubit may be either a 0, 1, or both 0 and 1 via superposition. As such, an 8-qubit memory may represent all numbers 0 through 255 at the same time. The qubits may be realized using a variety of approaches including photonics, trapped ions, semiconductors, superconducting material, and the like.

The storage 60 may be any suitable articles of manufacture that can serve as media to store processor-executable code, data, or the like. These articles of manufacture may represent computer-readable media (e.g., any suitable form of memory or storage) that may store the processor-executable code used by the qubit processor 54, the processor 56, or both to perform the presently disclosed techniques. The storage 60 may also be used to store data, various other software applications for analyzing the data, and the like. The storage 60 may represent non-transitory computer-readable media (e.g., any suitable form of memory or storage) that may store the processor-executable code used by the qubit processor 54, the processor 56, or both to perform various techniques described herein. It should be noted that non-transitory merely indicates that the media is tangible and not a signal.

The I/O ports 62 may be interfaces that may couple to other peripheral components such as input devices (e.g., keyboard, mouse), sensors, input/output (I/O) modules, and the like. The display 64 may operate to depict a representation of the 3D AR or VR visualizations associated with software or executable code being processed by the qubit processor 54, the processor 56, or both. In one embodiment, the display 64 may be a touch display capable of receiving inputs from a user of the quantum computing pathing system 12.

It should be noted that the components described above with regard to the quantum computing pathing system 12 are exemplary components and the quantum computing pathing system 12 may include additional or fewer components as shown. In addition, although the components are described as being part of the quantum computing pathing system 12, the components may also be part of any suitable computing device described herein, such as a vehicle system 18 or a wearable or mobile device 28, to perform the various operations described herein.

Keeping this in mind, the present embodiments may enable a path generation or management system to collect data from a variety of data sources disposed in an area (e.g., a smart city, smart building or campus, and so forth) and to use that data to facilitate path generation or updating for single individuals and/or for a group of individuals in the aggregate (i.e., to coordinate different paths for each member of a group of individuals whose paths and pathing preferences may impact one another). For example, a path generation or management system may periodically or continuously gather data regarding individual's path preferences and/or constraints within a common region or area through which each individual is projected to pass as part of their requested paths. The path generation or management system may also periodically or continuously gather sensor or other relevant data regarding that common region or area for the purpose of generating or updating the suggested paths. In such a context, the interplay of individual's preferences, constraints, and schedules as well as the changing relevant data to the data in which paths are being generated (e.g., traffic, accidents, break times, historical trend data, and so forth) may be used and optimized for each path so that suggested paths can be synergized with respect to one another and/or otherwise managed so as to optimize each path itself and the individual and with respect to other paths being generated or updated for other users in the vicinity.

Figure 3:
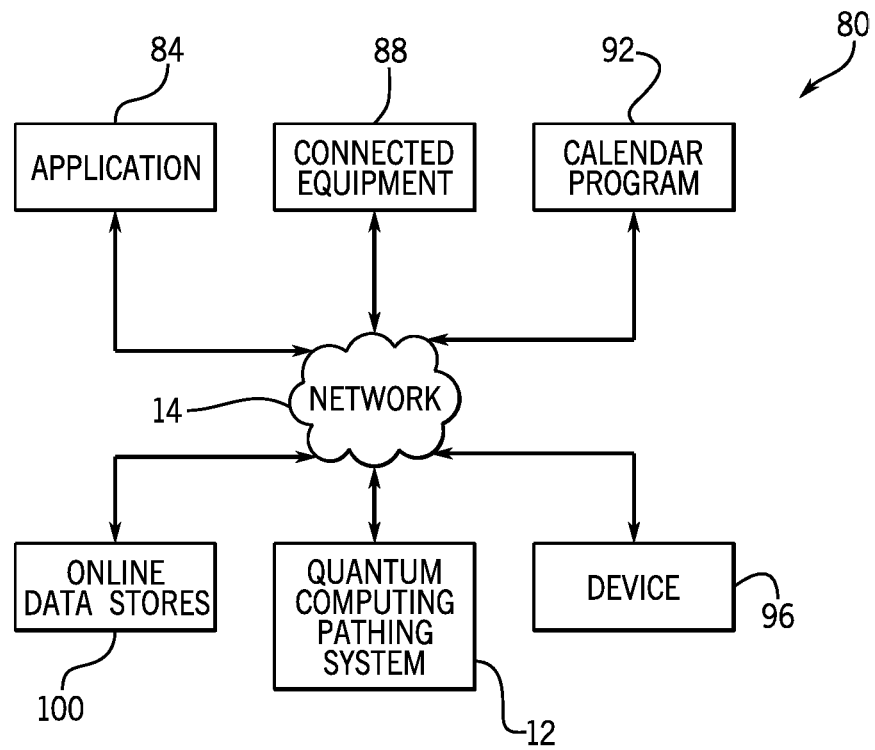
FIG. 3 illustrates a block diagram of an example network communication system that may be used in conjunction with a quantum computing path finding system, in accordance with aspects of the present disclosure.

By way of further introduction, FIG. 3 illustrates a block diagram of an example network communication system 80, in accordance with embodiments described herein. The network communication system 80 includes various data sources and stores as well as a communication connection to the quantum computing pathing system 12. Other interconnected devices or data stores may include, but is not limited to, one or more applications 84 via which different users may specify preferences and/or constraints (e.g., generically referred to as "preferences" or "path preferences" herein) to their path requests, various equipment 88 (e.g., cameras, smart home sensors or devises, traffic density or speed sensors, and so forth) communicatively coupled to the network 14, one or more calendar programs 92 which may contain scheduling data for one or more individuals relevant to a pathing problem (e.g., a schedule for a path requestor as well as proximate individuals whose activity could impact a path calculation), one or more personal devices 96 (e.g., wearable devices 28 such as watches, cellular telephones, and so forth), and one or more online data stores 100, such as social media databases 40 and electronic news databases 44. As will be appreciated, however, other devices and data stores relevant to path generation and updating may be connected to the network 14.

As discussed herein, an aspect of path generation in the present context, particularly in the context of combinatorial analysis and the benefits provided by using a quantum computing path generation system, is allowing users to specify multiple factors that may be simultaneously optimized or evaluated to generate a suggested path. As noted with respect to FIG. 3, in certain instances an application 84 may be provided to users by which the users may select or otherwise specify various factors to be evaluated during multi-factor path generation.

Figure 4:
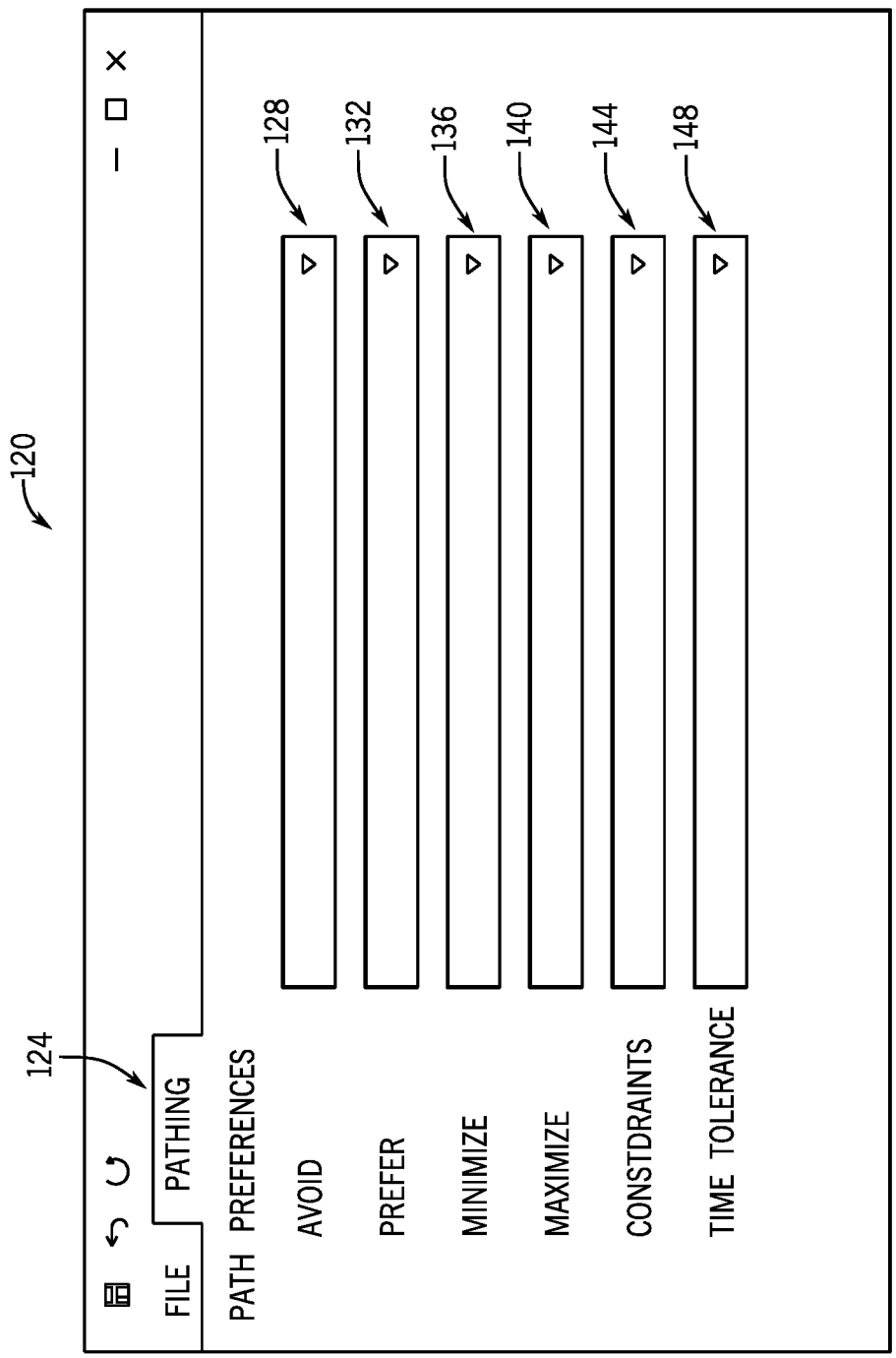
FIG. 4 depicts a sample screen of an application by which a user may specify variables or parameters to be used in a path finding context, in accordance with aspects of the present disclosure.

By way of example, and turning to FIG. 4, an example of a screen or GUI interface 120 generated by an application 84 for display on a processor-based system (e.g., workstation, cellular telephone, laptop computer, tablet computer, and so forth) is depicted. In accordance with certain embodiments, such an application 84 and interface 120 may be utilized to allow a user to specify or select various path preferences that may be considered in a multi-factor path generation process. Such factors specified via an interface 120 may be provided so as to be specific to a single or limited number of path generation or update executions (e.g., one-time or limited use) or may be maintained as a pathing profile for the user such that the saved factors are persistently maintained whenever a path is generated or updated for the user (e.g., universal preferences for the user). It should be noted that the present is merely illustrative and provided so as to facilitate explanation and to provide a real-world type example of an implementation. Correspondingly, other implementations and layouts of such an interface 120 may be employed while still falling under the contemplated scope of the present techniques.

With reference to FIG. 4, a pathing tab 124 of an application interface 120 is illustrated. Within the depicted tab 124 of the interface 120, multiple user-fillable fields are illustrated. In this example the fields are illustrated as drop-down menu fields, as shown by the downward arrow displayed on the right-hand side of each field. In practice however the fields and/or preferences can be entered using any suitable user interface technique, such as free-form or fillable fields, toggle buttons or switches, and so forth. In the depicted example, the interface 120 is depicted as including an avoid field 128 by which a user may specify one or more parameters or values constituting conditions to avoid when generating a path. By way of example, in a vehicular context a user might specify that one or more of toll roads, accidents, traffic density greater than a specified value, roads on which the average speed is less than a specified value, inclement weather, and so forth are to be avoided or excluded from a recommended path. In a pedestrian context (e.g., an intra-building or intra-campus context) a user might specify that one or more of conference rooms, passages have an occupant density greater than a specified value, elevators or stairs, outdoor passage ways or exposures, non-air condition or non-heated passages, and so forth are to be avoided or excluded from a recommended path.

Conversely, in a prefer field 132 of the interface 120 the user may specify one or more parameters or values constituting conditions to include or favor when generating a path. By way of example, in a vehicular context a user might specify that one or more of toll or non-toll roads, traffic density less than a specified value, roads on which the average speed is greater than a specified value, and so forth are to be preferred or included in a recommended path. In a pedestrian context (e.g., an intra-building or intra-campus context) a user might specify that paths passing by a break room or restroom are preferred and/or that one or more of passages having an occupant density less than a specified value, having an outdoor portion, having air conditioned or heated passages, and so forth are to be included or favored in a recommended path.

In a similar vein, the depicted interface 120 includes a minimize field 136 through which the user may specify one or more variables or parameters to be minimized during generation or updating of a proposed path. By way of example, in a vehicular context a user might specify that one or more of highway travel time, stop signs or lights, fuel consumed, surface road travel time, traffic density, distance traveled, and so forth are to be minimized in a recommended path. Similarly, in a pedestrian context (e.g., an intra-building or intra-campus context) a user might specify that one or more of time, distance traveled, exposure to other occupants, outdoor exposure, noise, aberrant temperatures, and so forth are to be minimized in a recommended path.

Conversely, the depicted interface 120 is also depicted as including a maximize field 140 through which the user may specify one or more variables or parameters to be maximized during generation or updating of a proposed path. By way of example, in a vehicular context a user might specify that one or more of fuel efficiency, average or median speed, highway distance traveled, surface road distance traveled, and so forth are to be maximized in a recommended path. Similarly, in a pedestrian context (e.g., an intra-building or intra-campus context) a user might specify that one or more of windows passed or outdoor exposure, average or median speed, distance traveled indoors, distance traveled outdoors, distance traveled with air conditioning or heat, distance traveled without seeing or coming into proximity of other occupants, and so forth are to be maximized in a recommended path.

In addition, in the example provided in FIG. 4 a constraints field 144 is included through which the user may specify one or more variables or parameters that may be specified that constrain proposed path, such as to affirmatively exclude solution paths that do not satisfy the parameter. By way of example, in a vehicular context a user might specify that toll roads are to be affirmatively excluded or included or that the estimated arrival time must be on or before a specified time. Similarly, in a pedestrian context (e.g., an intra-building or intra-campus context) a user might specify that paths including passage through a conference room or high-occupancy hallway or passage are to be affirmatively excluded or that the estimated arrival time must be on or before a specified time.

In a further aspect, and as shown in FIG. 4, the illustrated example of an interface 120 further include a time tolerance field 148 by which a user may specify a tolerance range or value for being early and/or late to a destination if a target time is known or estimated, such as based upon a meeting or event in a schedule or calendar of the user. By way of example, the user may be able to select or specify a quantity or range of time (e.g., 5 minutes, less than three minutes, and so forth) that can be used in path generation as a tolerance range when a scheduled arrival time is known or specified. In this manner, a user can specify the extent to which they can be early and/or late with respect to such a specified arrival time. As may be appreciated, though the preceding example is provided in the context of a tolerance with respect to an arrival time for path generation, in practice the time tolerance specified (or a different specified time tolerance) may be applied to a departure time in addition or in the alternative.

Figure 5:
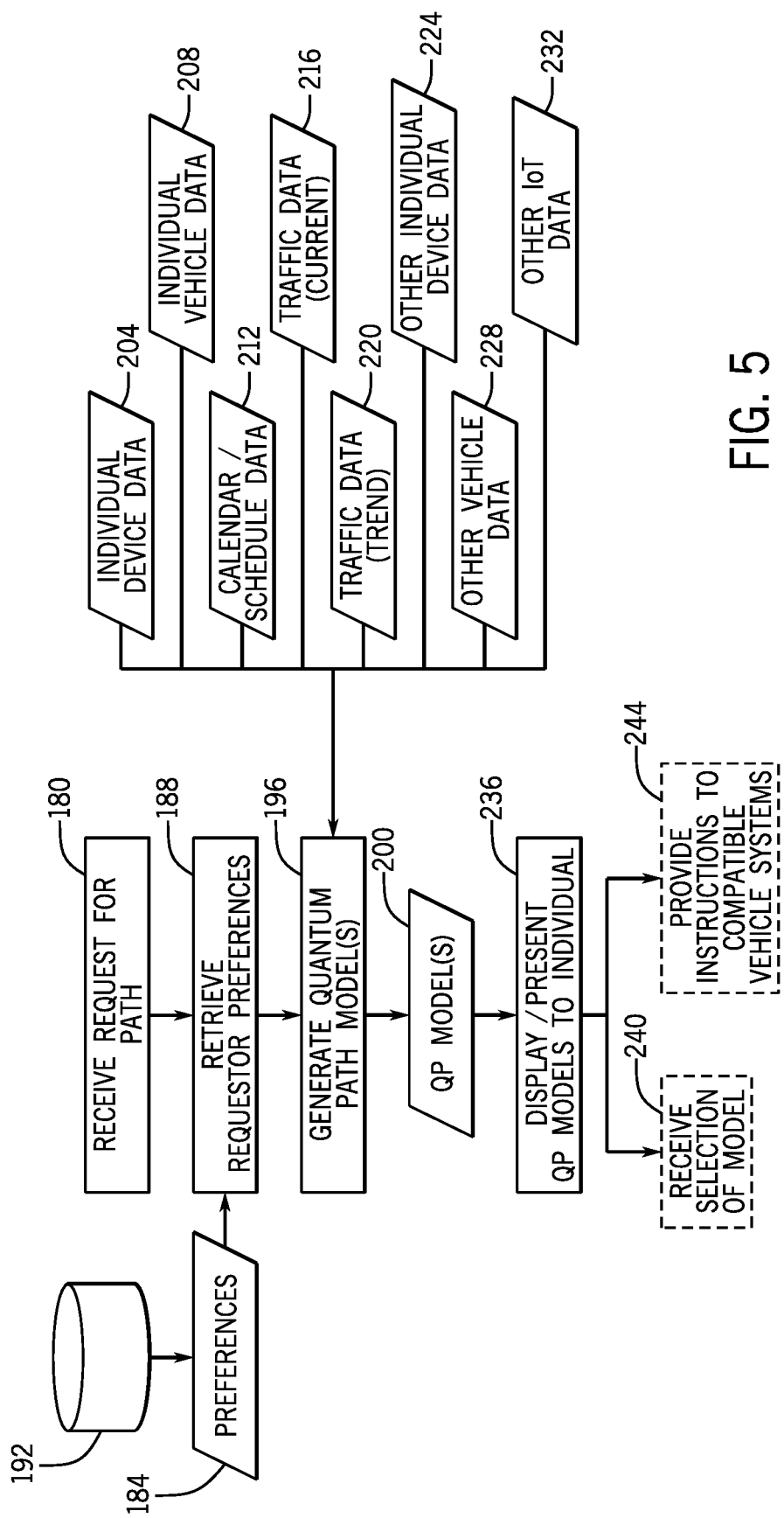
FIG. 5 depicts a sample process flow illustrating a vehicular path finding process, in accordance with aspects of the present disclosure.
Figure 6:
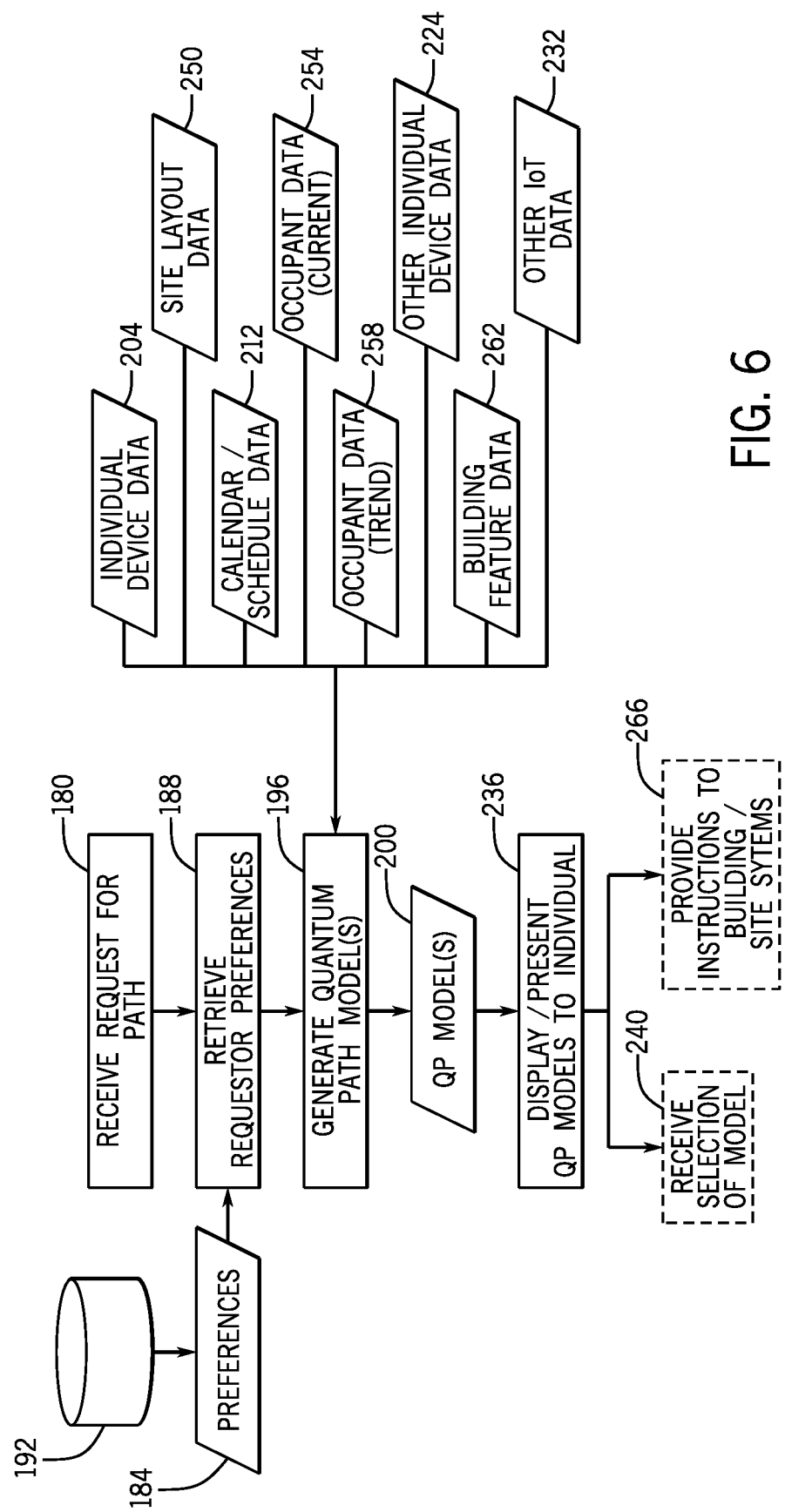
FIG. 6 depicts a sample process flow illustrating a pedestrian path finding process, in accordance with aspects of the present disclosure.

With the preceding in mind, and turning to FIGS. 5 and 6, example process flows are illustrated that illustrate steps that may be taken in computing one or more proposed paths in the context of quantum path models that address multiple factors and/or incorporate multiple data points. Turning to FIG. 5, a vehicle-based example is provided. In this example, a request for a path is received (block 180), such as by a quantum computing pathing system 12. Receipt of the request may in turn cause a set of requestor path preferences 184 to be retrieved (block 188), such as from a data store 192 associated with an application 84.

One or more quantum path models 200 may in turn be generated (block 196) by quantum computing pathing system 12 based upon the requestor's path preferences 184 and data obtained from a variety of sources. By way of example, in the depicted process flow data that may be acquired and used in path generation. Such data may include, but is not limited to, the illustrated sources. With respect to the illustrated data sources, such data may include individual device data 204 for the requestor, which may include location or movement data obtainable from a wearable device, cellular telephone, and so forth. In addition, data sources may include individual vehicle data 208 for the requestor, which may include vehicle GPS data, vehicle speedometer or operational data, dashcam images or video, and so forth. A further data source may include calendar or schedule data 212 for the requestor, which may include the date, time, and location for an event or appointment associated with the requested path. Another data source may include current traffic data 216, which may be obtained from online news or social media sites and may convey current traffic conditions with respect to traffic density or congestion and average traffic speeds. Similarly, historic or projected traffic trend data 220 may be accessed that illustrates projected changes in traffic patterns for the region and time range in question, such as the known or expected changes in traffic flow based on time of day to the extent it may be relevant to the current path generation process.

In certain embodiments data that is accessible for other individuals may be accessed as well. Such data may be particularly useful in contexts where the quantum computing pathing system 12 is determined paths for multiple individuals at the same time and where such paths may overlap or interrelate. In this manner, the data for multiple users may be obtained and utilized to synergize the path results and/or otherwise the combinatorial aspect of simultaneous path determination for multiple individuals. Indeed, in certain examples synergies may extend to generating paths for multiple individuals going the same direction or to the same destination that substantially overlap and allow for synergies related to caravanning. By way of example, to the extent the users' vehicles allow for autopilot (or other automatic driving features such as adaptive cruise control), the quantum computing pathing system 12 may instruct the vehicles to caravan in such a way as to reduce drag and improve fuel efficiency. In this manner, the quantum computing pathing system 12 may actually address pathing problems for a population of individuals in an aggregate and synergistic manner, as opposed to simply generating individual and independent path solutions.

With this in mind, data sources accessed by the quantum computing pathing system 12 may further include device data 224 for individuals other than the requestor, such as other individuals in the vicinity of a prospective path or who separately are requesting a path that might synergize with the requestor's path. Such data may include location or movement data obtainable from a wearable device, cellular telephone, and so forth. In addition, vehicle data 228 for individuals other than the requestor, such as for other individuals or vehicles in the vicinity of a prospective path or who separately are requesting a path that might synergize with the requestor's path. Such vehicle data 228 may include vehicle GPS data, vehicle speedometer or operational data, dashcam images or video, and so forth. In addition, other device data 232 (e.g., Internet-of-Things (IoT) data) may be accessed to facilitate individual our group path generation or updating. By way of example, image or video data from drones, from buildings or structures along a path, or from other sources may be accessed and employed, though any other type of sensor or image data may indeed be used to the extent that such data may be relevant to path generation or updating.

In the depicted example, one or more quantum path models 200 are generated using some or all of the preferences 184 of one or more path requestors as well as data acquired from some or all of the data sources shown. One or more of the quantum path models 200 may be selected for presentation (block 236) to the requestor as a recommended or suggested path model. If more than one path model 200 is presented to a requestor, they may select a path model and the selection may be received (block 240) by the system for continued display or other presentation. As described above, in synergized pathing contexts, instructions may be provided (block 244) to a vehicle system (e.g., an autopilot) for appropriate vehicle control (e.g., caravanning or drafting).

Turning to FIG. 6, an embodiment of such a process as may be applied to non-vehicle (e.g., pedestrian) path finding is illustrated. In this example, as in the preceding, a request for a path is received (block 180), such as by a quantum computing pathing system 12. Receipt of the request may in turn cause a set of requestor path preferences 184 to be retrieved (block 188), such as from a data store 192 associated with an application 84.

One or more quantum path models 200 may in turn be generated (block 196) by quantum computing pathing system 12 based upon the requestor's path preferences 184 and data obtained from a variety of sources. By way of example, in the depicted process flow data that may be acquired and used in path generation. Such data may include, but is not limited to, the illustrated sources. With respect to the illustrated data sources, such data may include individual device data 204 for the requestor, which may include location or movement data obtainable from a wearable device, cellular telephone, and so forth. In addition, data sources may include site layout data 250 applicable to the requested path, which may include building, campus, or facility layout or floor plan data, and so forth. A further data source may include calendar or schedule data 212 for the requestor (or other occupants, as discussed below), which may include the date, time, and location for an event or appointment associated with the requested path. An additional data source may include building or site feature data 262 relevant tot eh site for which a path is being determined. Such building or site feature data may include, but is not limited to, door sensor data, elevator sensor or use data, maintenance records and schedules, and so forth. In addition, other device data 232 (e.g., Internet-of-Things (IoT) data) may be accessed to facilitate individual our group path generation or updating. By way of example, image or video data from drones, from buildings or structures along a path, or from other sources may be accessed and employed, though any other type of sensor or image data may indeed be used to the extent that such data may be relevant to path generation or updating.

In certain embodiments data that is accessible for other individuals may be accessed as well. Such data may be particularly useful in contexts where the quantum computing pathing system 12 is determined paths for multiple individuals at the same time and where such paths may overlap or interrelate. In this manner, the data for multiple users may be obtained and utilized to synergize the path results and/or otherwise the combinatorial aspect of simultaneous path determination for multiple individuals. Indeed, in certain examples synergies may extend to generating paths for multiple individuals whose preferences overlap or are opposed. For example, preferences of different individuals as to whether their preferred path should include (e.g., maximize or prefer) other occupants (such as for security reasons) or should avoid (e.g., minimize or avoid) other occupants (such as for hygiene or health reasons) bay be concurrently balanced and managed as part of a multi-factor, combinatorial path generation or update process. In this manner, the quantum computing pathing system 12 may actually address pathing problems for a population of individuals in an aggregate and synergistic manner, as opposed to simply generating individual and independent path solutions.

With this in mind, other data sources may include, but are not limited to, current occupant or occupant location data 254, which may be obtained from building entry or log data (e.g., card key readers, cameras, RFID employee badges or identification, computer or workstation activity logs, and so forth. Similarly, historic or projected occupancy trend data 258 may be accessed that illustrates projected changes in occupancy patterns for the site (e.g., building, campus, facility, and so forth) and time range in question, such as the known or expected changes in occupancy flow based on time of day, known employee or student schedules, and/or previously observed occupancy data based on date and time. Similarly, device data 224 for individuals other than the requestor may also be acquired and utilized, such as device data for other individuals in the vicinity of a prospective path or who separately are requesting a path that might synergize with the requestor's path. Such data may include location or movement data obtainable from a wearable device, cellular telephone, and so forth.

In the depicted example, one or more quantum path models 200 are generated using some or all of the preferences 184 of one or more path requestors as well as data acquired from some or all of the data sources shown. One or more of the quantum path models 200 may be selected for presentation (block 236) to the requestor as a recommended or suggested path model. If more than one path model 200 is presented to a requestor, they may select a path model and the selection may be received (block 240) by the system for continued display or other presentation. In certain contexts, instructions may be provided (block 266) to a building or site system (e.g., an elevator call system, a door lock engagement/disengagement system, lighting systems, shade or blind systems) for appropriate control of such systems in view of the selected path model and/or user preferences 184.

Figure 7:
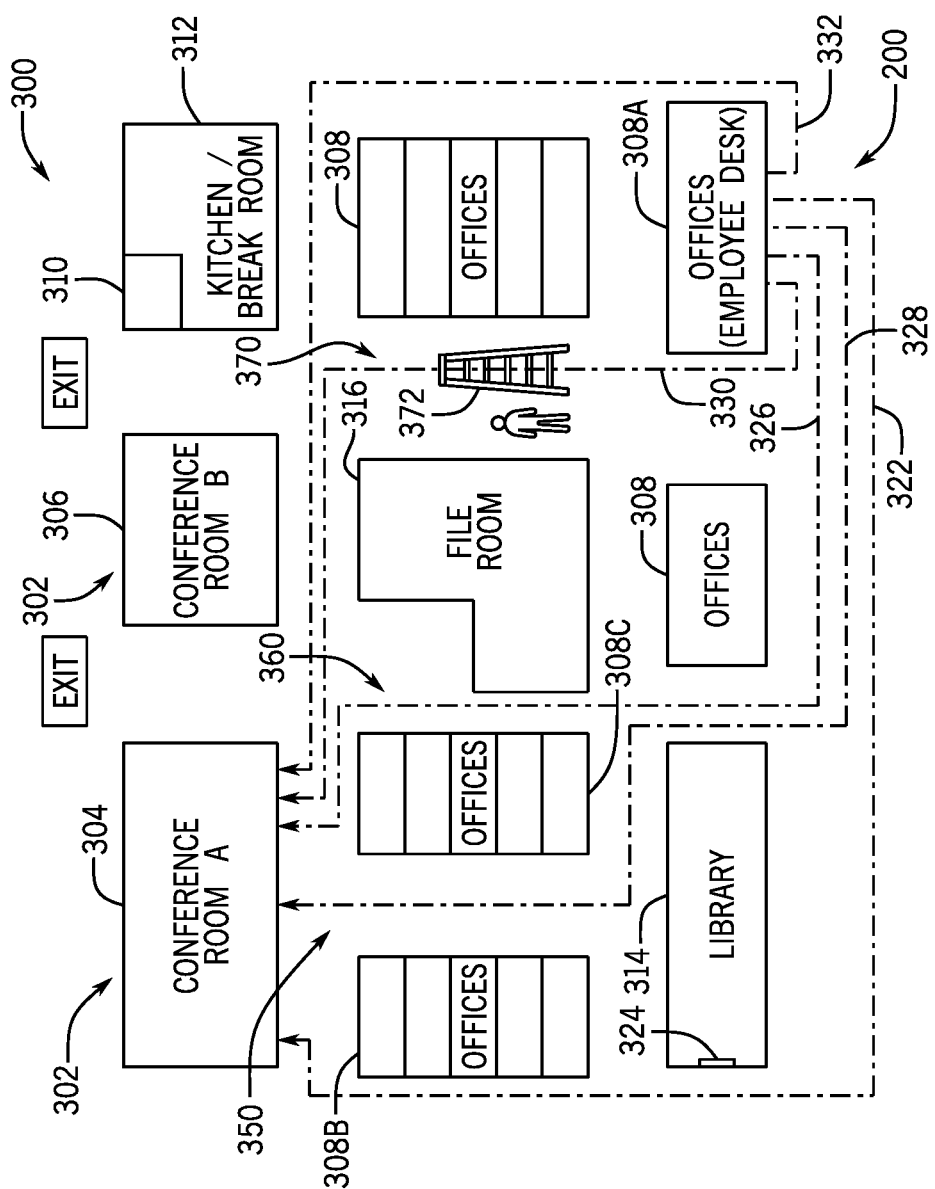
FIG. 7 illustrates an example of a building layout and possible paths, in accordance with aspects of the present disclosure.

With the preceding example in mind, FIG. 7 illustrates an example of an office environment 300 from which an optimal pathway may be utilized in using the method of FIG. 6. The office environment 300 includes one or more conference rooms 302 (e.g., conference room A (304), conference room B (306)). The office environment 300 also includes one or more offices 308, such as cubicles, shared work spaces, private offices, and so forth. The office environment 300 may also include one or more community spaces such as a kitchen 310, a break room 312, a library 314, a file room 316, and the like. Various entrances, exits, doors, staircases, elevators, etc. may also be found in the office environment 300.

As discussed above with reference to FIG. 6, a number of potential pathways (i.e., quantum path models 200) may be generated based in part on the individual's preferences, the environmental data, and the location of the individual among other factors. The potential path models 200 may be ranked by duration of the path, safest route, whether maintenance or other obstructions are avoided, number of other people present in the pathway, and other factors so that the pathways 200 may to varying degrees address a user's provided preferences. In the illustrated embodiment, five potential pathways to the meeting location in conference room A are shown. A first potential pathway is illustrated by path 322. The first potential pathway 322 begins from the individual's office 308A. The first potential pathway 322 may accommodate the individual's preference for going to the library 314, prior to going to conference room A 304. The first potential pathway 322 goes past a library entrance 324, thereby increasing the usefulness of the pathway for the individual. In the illustrated embodiment, the first potential pathway 322 is ranked higher than other potential pathways (e.g., third potential pathway 328, fourth potential pathway 330).

A second potential pathway is identified by path 326, where the second potential pathway 326 also goes past the library 314. However, the second potential pathway 326 does not go past the library entrance 324, and only passes by a side of the library 314 where no access to the library is granted. Accordingly, the second potential pathway 326 has a decreased usefulness when compared to the individual's preferences. However, the second potential pathway 326 is still close in proximity to the library 314 compared some of the other potential pathways (e.g., fourth potential pathway 330, fifth potential pathway 332). Thus, the second potential pathway 326 may still be ranked higher than the fourth potential pathway 330 and the fifth potential pathway 332 when the individual's preferences (i.e., stopping by the library 314 before the meeting) are considered. After passing the library 314, the second potential pathway 326 includes a path that goes between a wide hallway 350 between a first cluster of offices 308B and a second cluster of offices 308C. The wide hallway 350 enables the individual to pass easily through the hallway with less likelihood (i.e., lower probability) of being in close proximity to another individual, which may be a preference of the route requestor. Due to the relative ease for the individual to pass through the hallway 350 in the second potential pathway 326, the second potential pathway 326 may be ranked higher than other paths that have a narrower hallway width, an obstruction, a barrier, or the like.

A third potential pathway is identified by path 328. The third potential pathway 328 does not go past the library entrance 324. Thus, in this particular example, the third potential pathway 328 may be ranked lower than the first potential pathway 322 and the second potential pathway 326. The third potential pathway 328 goes through a narrow hallway 360. In the illustrated example, the narrow hallway 360 is narrower than the adjacent hallways (e.g., first hallway 350 and third hallway 370) due to the shape of the file room 316. Here, the shape of the file room 316 creates the narrow hallway 360 which reduces the ease at which the individual can pass and/or may increase the probability of being in close proximity to other occupants, which may be precluded by the requestor's preferences 184.

A fourth potential pathway is identified by path 330. The fourth potential pathway 330 does not go past the library entrance 324. Thus, in this particular example, the fourth potential pathway 330 may be ranked lower than the first potential pathway 322 and the second potential pathway 326. The fourth potential pathway 330 would also cause the individual to go through an area with a temporary obstruction 372, such as an area where maintenance or custodial activity is in progress. Thus, even though the third hallway 370 may be passable, the temporary obstruction 372 would make the fourth potential pathway 330 less preferred to pass through or completely impassable.

Finally, a fifth potential pathway is identified by path 332. The fifth potential pathway does not go past the library 314.

Thus, the fifth potential pathway 332 may be ranked lower than the first potential pathway 322 and the second potential pathway 326 when the individual's preference to go past the library 314 is considered. However, if the individual does not need to go to the library on the way to the meeting, the fifth potential pathway 332 may rank higher than the third potential pathway 328 and the fourth potential pathway 330, since the proposed path is not unusually narrow (e.g., like the second hallway 326) or blocked by a temporary obstruction (e.g., like the third hallway 372). Relative to the first potential pathway 322, the fifth potential pathway 332 may be ranked the same when the individual does not need to go to the library before the meeting, as the first potential pathway 322 since the fifth potential pathway 332 avoids obstructions and gets the individual to the meeting in a comparable amount of time.

In this manner, the disclosure provides benefit by leveraging quantum computing techniques and myriad data sources to derive probabilistic and combinatorial path models that may satisfy single requestor preferences or the aggregated preferences of multiple path requestors. The path models so generated may enable time and travel optimization of an individual or group of individuals in a way that would be difficult or impossible without embodiments disclosed herein.

While only certain features of the invention have been illustrated and described herein, many modifications and changes will occur to those skilled in the art. It is, therefore, to be understood that the appended claims are intended to cover all such modifications and changes as fall within the true spirit of the invention.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A method, comprising:
   receiving a request to generate a vehicle path for a requestor;
   retrieving one or more preferences to be applied in generating the vehicle path, wherein the one or more preferences comprise requestor specified or selected values conveying conditions to prefer when generating the vehicle path;
   accessing one or more data stores and sensor data pertaining to the requestor, other individuals relevant to vehicle path generation, and a site or region relevant to vehicle path generation, wherein the one or more data stores and the sensor data comprise device data for the other individuals, vehicle data for the other individuals, and respective paths or guidance associated with the other individuals;
   generating one or more vehicle path models using quantum computational techniques and based on the one or more preferences and the one or more data stores and the sensor data, wherein the quantum computational techniques comprise a combinatorial analysis performed by a qubit processor, wherein the qubit processor is configured to generate the one or more vehicle path models in real time based on the one or more data stores and sensor data; and
   providing the one or more quantum computed vehicle path models to the requestor to select the vehicle path.

2. The method of claim 1, wherein the one or more preferences comprise additional requestor specified or selected values conveying variables to minimize or maximize.

3. The method of claim 1, wherein the one or more preferences comprise additional requestor specified or selected values conveying constraints on the vehicle path.

4. The method of claim 1, wherein the one or more preferences comprise additional requestor specified or selected values conveying tolerances with respect to the vehicle path, wherein the values conveying tolerances comprise a time value indicating a tolerance range for being early and/or late to a destination.

5. The method of claim 1, wherein the one or more data stores and the sensor data comprise one or more of device data for the requestor, vehicle data for the requestor, calendar or schedule data, current traffic data, or projected traffic data.

6. The method of claim 1, wherein generating the one or more vehicle path models is further based on additional requests from additional individuals requesting additional vehicle paths in a same region and time frame, wherein the one or more vehicle path models are determined to overlap with the requested additional vehicle paths for the additional individuals, wherein the one or more vehicle path models enable caravanning between the requestor and the additional individuals, and wherein caravanning between the requestor and the additional individuals is configured to reduce a drag experienced by a vehicle operated by the requestor, an additional vehicle operated by one or more of the additional individuals, or both.

7. The method of claim 1, wherein the quantum computational techniques comprise representing an input variable in a multidimensional space as a one bit, a zero bit, or as both simultaneously.

8. A quantum computing path generation system, comprising:
   a communication component configured to facilitate communication between the quantum computing path generation system and devices or data stores accessible over a network;
   a qubit processor;
   a processor configured to execute processor-executable code to instruct the qubit processor to perform path generation operations;
   a qubit memory comprising one or more qubits and utilized by the qubit processor; and
   a storage configured to store processor-executable code executed by the processor, wherein the processor-executable code, when executed, cause the quantum computing path generation system to perform acts comprising:
      receiving a request to generate a vehicle path for a requestor;
      retrieving one or more preferences to be applied in generating the vehicle path, wherein the one or more preferences comprise requestor specified or selected values conveying conditions to prefer when generating the vehicle path;
      accessing one or more data stores and sensor data pertaining to the requestor, other individuals relevant to vehicle path generation, and a site or region relevant to vehicle path generation;

generating one or more vehicle path models using quantum computational techniques and based on the one or more preferences and the one or more data stores and sensor data, wherein the quantum computational techniques comprise a combinatorial analysis performed by the qubit processor, wherein the qubit processor is configured to generate the one or more vehicle path models in real time based on the one or more data stores and the sensor data, wherein generating the one or more vehicle path models is further based on additional requests from additional individuals requesting additional vehicle paths in a same region and time frame, and wherein the one or more vehicle path models overlaps with a portion of the additional vehicle paths; and providing the one or more quantum computed vehicle path models to the requestor to select the vehicle path.

9. The quantum computing path generation system of claim 8, wherein the one or more preferences comprise additional requestor specified or selected values conveying variables to minimize or maximize.

10. The quantum computing path generation system of claim 8, wherein the one or more preferences comprise additional requestor specified or selected values conveying constraints on the vehicle path.

11. The quantum computing path generation system of claim 8, wherein the one or more data stores and the sensor data comprise one or more of device data for the requestor, vehicle data for the requestor, calendar or schedule data, current traffic data, projected traffic data, device data for the other individuals, or vehicle data for the other individuals.

12. The quantum computing path generation system of claim 8, wherein the one or more data stores and the sensor data comprise site or facility layout or plan data, current occupant data, projected occupant data, or building or site feature data.

13. The quantum computing path generation system of claim 8, wherein the one or more vehicle path models enable caravanning between the requestor and the additional individuals, and wherein caravanning between the requestor and the additional individuals is configured to reduce a drag experienced by a vehicle operated by the requestor, an additional vehicle operated by one or more of the additional individuals, or both.

14. The quantum computing path generation system of claim 8, wherein the quantum computational techniques comprise representing an input variable in a multidimensional space as a one bit, a zero bit, or as both simultaneously.

15. A method, comprising:
displaying an interface of a vehicle path finding application, wherein the interface comprises fields comprising:
an avoid field;
a prefer field;
a minimize field; and
a maximize field;
receiving inputs for the one or more fields via the interface; and
generating one or more vehicle path models using quantum computational techniques and based on the inputs, wherein the quantum computational techniques comprise a combinatorial analysis performed by a qubit processor, wherein the qubit processor is configured to generate the one or more vehicle path models in real time based on one or more data stores and sensor data, wherein the one or more data stores and the sensor data comprise device data for other individuals and vehicle data for other individuals, wherein generating the one or more vehicle path models is further based on additional requests from additional individuals requesting additional vehicle paths in a same region and time frame, and wherein the one or more vehicle path models overlaps with a portion of the additional vehicle paths; and
displaying the one or more vehicle path models for review.

* * * * *